Figure 1:
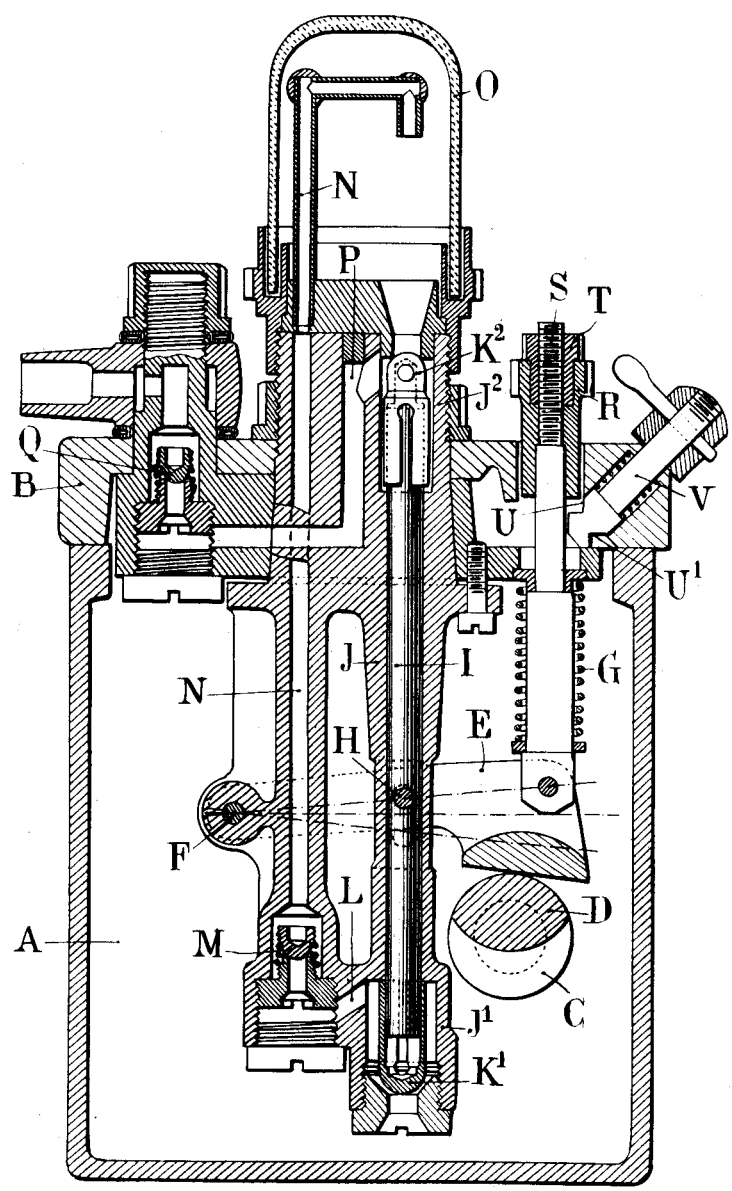

UNITED STATES PATENT OFFICE.

JEAN NÉPOMUCÈNE HOCHGESAND, OF PARIS, FRANCE.

LUBRICATING-PUMP.

1,051,888.

Specification of Letters Patent.  Patented Feb. 4, 1913.

Application filed August 29, 1911. Serial No. 646,649.

*To all whom it may concern:*

Be it known that I, JEAN NÉPOMUCÈNE HOCHGESAND, of 200 Quai de Jemmapes, Paris, Republic of France, have invented a Lubricating-Pump, of which the following is a full, clear, and exact description.

The present invention has for its object, a lubricating pump in which the flow of lubricant can be seen and in which it may be regulated, which will work regularly even when the flow is very small.

This pump has driven valves so that the suction of the liquid takes place regularly even during very short strokes of the piston, which does not usually take place in pumps provided with spring valves which necessitate a considerable depression to produce the unsticking of the valve. The flow is regulated at will by varying the stroke of the piston. An arrangement permits, without disarranging the regulation of normal working, of obtaining a more abundant lubrication when that is necessary, for example, at starting.

By way of example, the drawing represents two methods of carrying the invention into effect.

Figure 2:
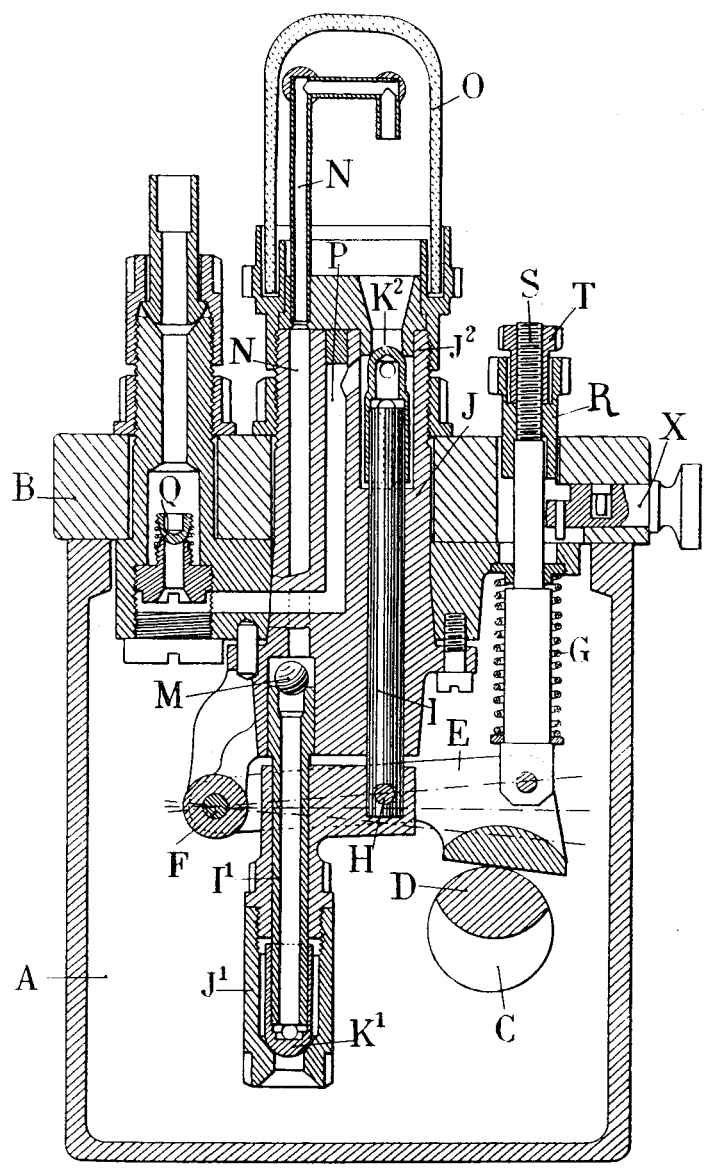

Figure 1 represents a vertical section of a form having a double piston. Fig. 2 shows a modification.

Upon an oil chamber A (Fig. 1) rests a cover B which carries a series of lubricating pumps similar to that represented in the section and arranged upon a line at right angles to the plane of the figure. A shaft C, which passes through the chamber A and in which are cut cams D, works the whole series of pumps. Upon each cam D bears the end of a lever E pivoted at F and forced downward by a spring G. The lever E moves by means of a pin H a vertical rod I which slides an easy fit in a tube J at each end of which is a pump body $J^1$ $J^2$, in which the rod I forms the piston. A valve $K^1$ covers the lower end of the rod I and a valve $K^2$ covers its upper end. Each of these valves is constituted by a hollow sleeve, in the form of a thimble closed at one end by a spherical cap and having a plurality of longitudinal splits. The splits are large enough to permit the oil to flow freely from the exterior to the interior of the sleeve and vice-versa. The interior boring of the sleeve is slightly less than that of the rod I so that when the sleeve is sprung thereover it will grip the rod I sufficiently to be carried along with it. The lower pump body $J^1$ communicates by a channel with a valve box M located at the base of a tube N which is curved or bent at the upper part in the interior of a glass sight tube O so as to open above the upper part of the pump body $J^2$. This latter communicates by a passage P with a lubricating conduit at the lower part of which is arranged a valve Q.

The operation of the pump is as follows: The cam D in turning raises the lever E and consequently the rod I. This latter moves first the valve $K^1$ until its upper part presses against the bottom of the pump body $J^1$ then continues to rise sliding in the interior of $K^1$ sucking the oil which penetrates into the valve $K^1$ by the splits. The cam D continues to turn, the lever E redescends under the action of the spring G. The valve $K^1$ moved by the rod I closes the entrance to the pump body $J^1$ and the rod I continuing to descend sliding in the interior of the split sleeve, the oil is forced into the passage L and the tube N whence it falls into the upper pump body $J^2$. The operation of the rod I and of the valve $K^2$ in the pump body is the same as that of the rod I and of the valve $K^1$ in the pump body $J^1$. The oil is then sucked up afresh then forced out into the channel P and finally into the lubricating conduit. The flow is regulated by means of a nut R which is screwed upon a threaded rod S attached to the lever E and which a lock nut T prevents unscrewing. The base of the nut R when the lever E descends again rests upon the flat face of a notch U cut in the end of an oblique rod V thus limiting in a downward direction the motion of the lever E and consequently of the rod I. The cam D raising the lever E always to the same height and the nut R allowing it to descend more or less, it is clear that the stroke of the piston I and consequently the delivery of the pump may be regulated at will. A second notch $U^1$ deeper than the notch U is provided in the rod V. It is sufficient therefore to turn the rod V from one side to the other to obtain two different abutments for the nut R and consequently two different deliveries of the pump without disarranging the nut R.

In Fig. 2 the rotatable rod V is replaced by a sliding bolt X. When this bolt is in the withdrawn position, the full flow is obtained and when the bolt is in the position in which it acts as a stop, the nut R abuts upon it and the reduced flow is obtained. In Fig. 2 there will be noticed in addition a different mounting of the lower pump body J¹ which is connected to the lower end of the rod I and slides upon a fixed hollow piston I¹ into the interior of which the oil passes to enter the tube N. The advantage of this arrangement is that when the lever E descends and consequently the pump body J¹ the inertia of the oil assists its entry into the said pump body. The filling of the pump body thus takes place more easily than in the arrangement shown in Fig. 1.

Claims:

1. In a lubricating pump, a cylinder and a piston, one movable relatively to the other, valves constituted by thimble-shaped split sleeves, branches on said valves adapted to be sprung over the ends of said piston, inlet members formed with an orifice, and edges to said orifices forming seats for the solid bottoms of said valves.

2. In a lubricating pump, a cylinder and a piston movable relatively to one another and valves constituted by split sleeves having a spherical bottom, fitted on the ends of the piston.

3. In a lubricating pump, a cylinder and a piston movable relatively to one another, valves constituted by split sleeves fitted on the ends of the piston, a seat for each sleeve, a suction conduit and a delivery conduit corresponding to each valve.

4. In a lubricating pump, a cylinder and a piston, one movable relatively to the other, valves constituted by split sleeves fitted on the ends of the piston, a cam controlling said piston, a lever connected to said piston, a rod pivoted to said lever, a nut on said rod, and an abutment provided with notches of different depths with which said nut engages for limiting the downward movement of said piston.

The foregoing specification of my lubricating pump signed by me this 18th day of August 1911.

JEAN NÉPOMUCÈNE HOCHGESAND.

Witnesses:
H. C. COXE,
R. THIRIOT.